United States Patent [19]

Kogo et al.

[11] 4,074,317

[45] Feb. 14, 1978

[54] MULTI-CHANNEL VIDEO DISPLAY APPARATUS USING SEQUENTIAL CIRCUIT

[75] Inventors: Hiroshi Kogo, Tokyo; Tokuji Kato, Chiba; Takashi Uematsu, Yokohama, all of Japan

[73] Assignee: Nissan Motor Company, Limited, Japan

[21] Appl. No.: 738,575

[22] Filed: Nov. 3, 1976

[30] Foreign Application Priority Data

Nov. 5, 1975   Japan ................................ 50-132113

[51] Int. Cl.$^2$ ............................................. H04N 5/22
[52] U.S. Cl. .................................... 358/181; 358/242; 358/146
[58] Field of Search .................. 358/22, 108, 146, 142, 358/160, 180, 181, 183, 185; 340/324 AD; 315/374

[56] References Cited

U.S. PATENT DOCUMENTS

| | | |
|---|---|---|
| 3,207,842 | 9/1965 | Flagle ...................................... 358/183 |
| 3,256,386 | 6/1966 | Morchano ............................ 358/146 |

Primary Examiner—John C. Martin
Attorney, Agent, or Firm—Robert E. Burns; Emmanuel J. Lobato; Bruce L. Adams

[57] ABSTRACT

A multi-channel video display apparatus comprises a channel selector circuit including a plurality of manually operated switches, a sequential circuit to generate an output in response to the operating sequence of the switches in step with a vertical synchronization pulse, and a video signal gate circuit for passing a video signal in response to the output from the sequential circuit to the electrode of a cathode ray tube. The output from the sequential circuit is used to generate a series of horizontal and vertical beam positioning DC potentials for biasing the sawtooth waveforms to provide simultaneous display of the video signals on the screen of the cathode ray tube.

5 Claims, 3 Drawing Figures

MULTI-CHANNEL VIDEO DISPLAY APPARATUS USING SEQUENTIAL CIRCUIT

The present invention relates generally to image display apparatus and in particular to multi-channel video display apparatus in which two or more video signals are reproduced on desired areas of a CRT screen.

In prior art multi-channel television systems, the received television signal on different channels are reproduced on predetermined areas of the CRT screen and the arrangement of the reproduced images on the screen cannot easily be changed.

It is an object of the present invention to provide multi-channel video display apparatus which permits the viewer to easily interchange the location of the reproduced images on command of a plurality of channel selector switches.

It is another object of the invention to provide multi-channel video display apparatus which includes a counter for each of the channel selector switches to determine the order of sequence with which the transmitted video signals are gated for reproduction.

It is a further object of the invention to provide an electrical circuit of simple construction for sequencing the video signals by the operating sequence of the channel selector switches.

Briefly described, an embodiment of the invention comprises a plurality of channel selector switches, a sequencing circuit including a plurality of $n$-digit counters corresponding to the selector switches, where $n$ equals to the number of selector switches, video signal gate circuit responsive to the output from the sequencing circuit, and a circuit for generating a series of horizontal and vertical beam positioning DC potentials responsive to the output from the sequencing circuit to reproduce the gated video signals on the screen of a cathode ray tube. The counters are normally in the reset condition in the absence of a signal from the corresponding selector switch and readied to accept a signal when the switch is operated. The subsequent operations of other selector switches cause the counters associated with the previously operated switches to count signals from the subsequently operated switches. The output from each counter is applied to the video signal gate circuit in step with a vertical synchronization pulse after all of the selector switches have been operated.

The invention will further described with reference to the accompanying drawings, in which.

Figure 1A:
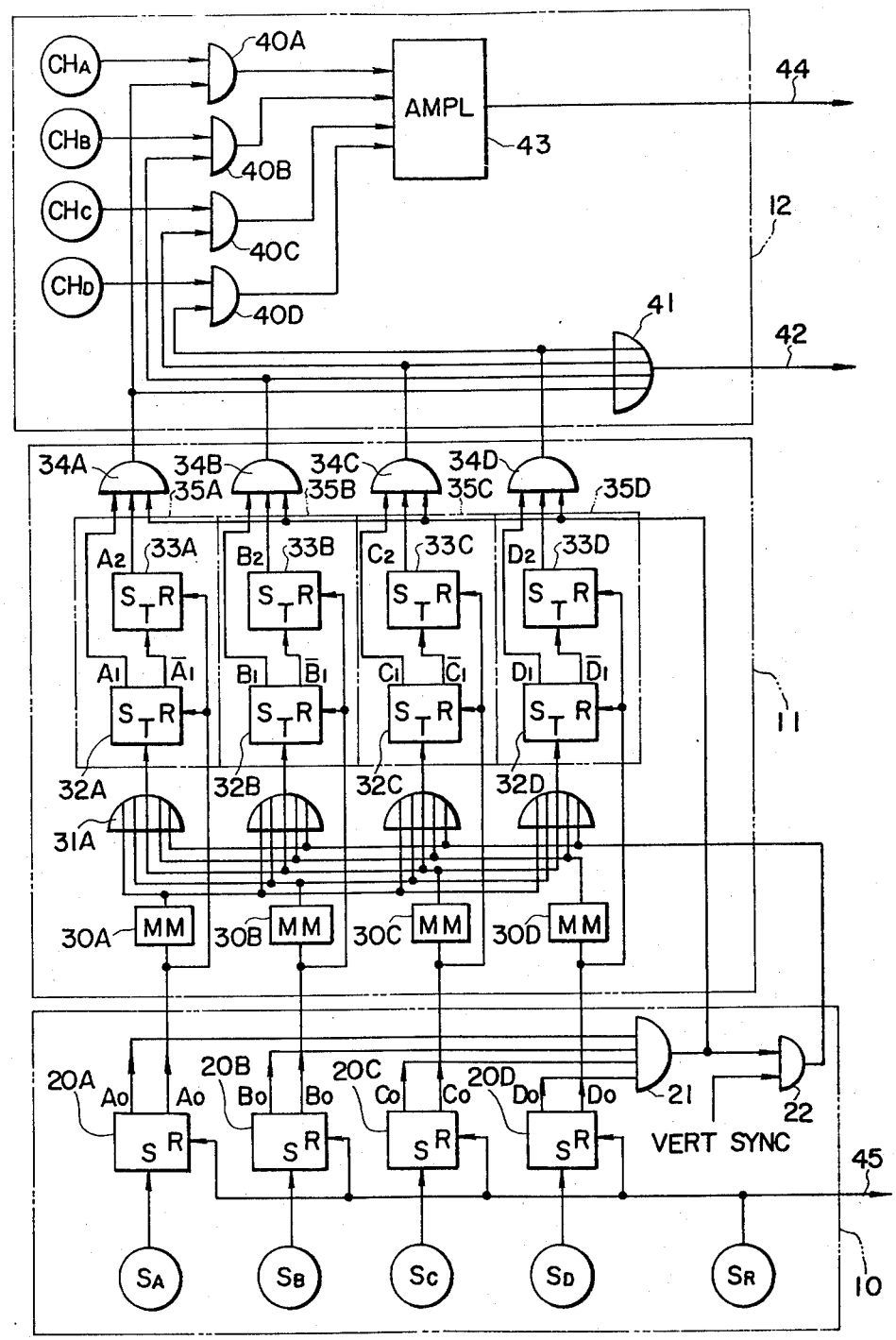
FIG. 1 is a circuit diagram of an embodiment of the invention.
Figure 1B:
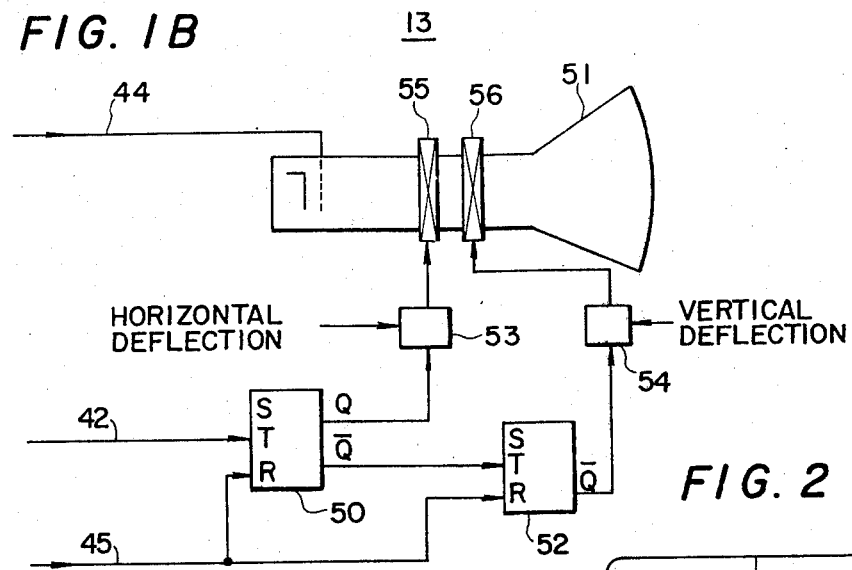

Referring now to FIG. 1, an embodiment of the present invention is shown and comprises generally a channel selection circuit 10, a sequential circuit 11 which responds to the output from the channel selection circuit 10, a video signal gate circuit 12 for passing video signals of selected channels in the order determined by the sequential circuit 11 (FIG. 1A) to a video display unit 13 (FIG. 1B).

In FIG. 1A, the channel selection circuit 10 comprises a plurality of channel selection momentary switches $S_A$, $S_B$, $S_C$, and $S_D$ and a momentary type reset switch $S_R$. Each of the channel selection switches is connected to the set terminal of corresponding one of flip-flops 20A, 20B, 20C and 20D, and the reset switch is connected to the reset terminals of the flip-flops 20A and 20D. The true output of each flip-flop 20 is connected to an input of an AND gate 21 and the complementary output is connected to corresponding one of monostable multivibrators 30A, 30B, 30C and 30D and also to the reset terminals of a corresponding pair of S-T-R flip-flops 32 and 33. The output from each monostable multivibrator is connected through OR gates 31A, 31B, 31C and 31D to the trigger input terminals of S-T-R flip-flops 32A, 32B, 32C and 32D. The true output of each flip-flop 32 is connected to a first input of corresponding one of AND gates 34A, 34B, 34C and 34D, and the complementary output is connected to the trigger input of flip-flop 33 in the corresponding pair. The true output of each flip-flop 33 is connected to a second input of the corresponding AND gate 34.

The output of AND gate 21 of channel selection circuit 10 is connected on the one hand to the third input terminals of AND gates 34A to 34D of the sequential circuit 11 and on the other hand to an input of an AND gate 22 of the channel selection circuit 10. The AND gate 22 is to pass vertical synchronization pulses to the trigger input terminals of flip-flops 32A to 32D through corresponding OR gates 31.

Each pair of flip-flops 32 and 33 constitutes a four-digit counter to deliver a high-level output to the first and second inputs of AND gate 34 simultaneously for every count of four input pulses from the corresponding OR gate 31. The input pulse to each four-digit counter occurs when the complementary output of the corresponding flip-flop 20 changes to the "0" binary state which causes the corresponding monostable multivibrator 30 to generate an output pulse, or when AND gate 22 is enabled to pass a vertical synchronization to its output. The outputs from AND gates 34A to 34D of the sequential circuit 11 are connected to an input of AND gates 40A, 40B, 40C and 40D of the gate circuit 12, respectively, and through an OR gate 41 and lead 42 to the trigger input of a flip-flop 50 of the display unit 13. Video signals on channels $CH_A$, $CH_B$, $CH_C$, and $CH_D$ are respectively connected to the second inputs of the AND gates 40A to 40D and thence to the input of an amplifier 43. The amplified video signals are applied through lead 44 to the control electrode of a cathode ray tube 51. The true output of flip-flop 50 is connected to a voltage combining network 53 to which is also coupled a horizontal deflection voltage and its complementary output is connected to the trigger input of flip-flop 52. The complementary of flip-flop 52 is connected to a second voltage combining network 54 to which is applied a vertical deflection voltage. The horizontal and vertical deflection coils 55 and 56 of the cathode ray tube are energized by the currents supplied respectively from the networks 53 and 54.

Figure 2:
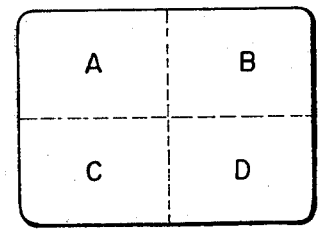
FIG. 2 is a front view of the screen of a cathode ray tube used in the circuit of FIG. 1.
Figure 3A:
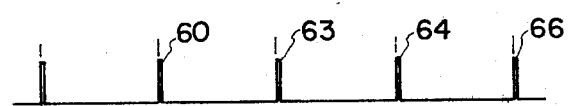
FIG. 3 is a series of waveforms appearing at various points of the circuit of FIG. 1.
Figure 3B:
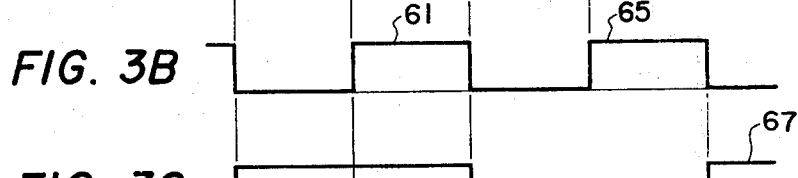
Figure 3C:
Figure 3D:
Figure 3E:
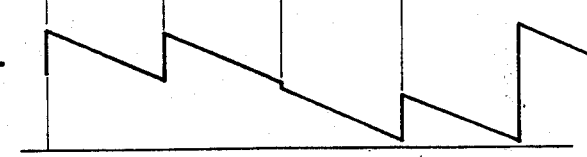

In operation, the reset switch $S_R$ is manually operated to rest flip-flops 20A to 20D and flip-flops 50 and 52. With the flip-flops 20A to 20D being under the reset condition, the complementary outputs $\bar{A}_o$ to $\bar{D}_o$ of the flip-flops switch to "1" to maintain flip-flops 32 and 33 of each four-digit counter of the sequential circuit 11 under the reset condition. Assume that video channels A, B, C and D are reproduced in a manner as shown in FIG. 2, the selector switches being operated sequentially in the order of $S_A$, $S_B$, $S_C$ and $S_D$.

With the operation of switch $S_A$, flip-flop 20A changes to the set condition and its complementary output $\bar{A}_o$ goes low. This conditions flip-flops 32A and 33A to accept input pulses on their trigger inputs. The trigger signal is supplied from the monostable multivibrator 30A at the instant the complementary output $\bar{A}_o$ is switched to the "0" binary state. Therefore, the true output $A_1$ of flip-flop 32A switches to the "1" logic state, while the output $A_2$ of flip-flop 33A switches to the "0" state. The subsequent operation of selector switch $S_B$ triggers a series of similar circuit actions to those described in connection with the selector switch $S_A$, so that the binary states of true outputs $B_1$ and $B_2$ of flip-flops 32B and 33B are "1" and "0", respectively. Since the flip-flops 32A and 33A have been conditioned to accept input signals from OR gate 31A, the pulses from monostable multivibrator 30B turns off flip-flop 32A and turns on flip-flop 33A. The output states of flip-flops 32A and 33A are thus "0" and "1", respectively. Subsequent operation of selector switch $S_C$ will cause monostable multivibrator 30C to pass a signal to flip-flops 32A and 32B as well as to flip-flop 32C. Flip-flop 32A is turned on so that the outputs $A_1$ and $A_2$ are simultaneously at the "1" logic state.

It will be understood therefore that the true outputs of flip-flops 32 and 33 of each four-digit counter 35 are simultaneously at the "1" logic state for every counter of four input pulses through OR gate 31 and AND gates 34A to 34B will be activated sequentially after AND gate 21 has been activated as described below. The operation of selector switch $S_D$ counts up each counter 35. Since, up to this time, flip-flops 20A to 20C have been in the set condition, the operation of switch $S_D$ activates AND gate 21 so that AND gates 34A to 34D are ready to pass gating signals to the channel gate circuit 12, and AND gate 22 is enabled to pass a vertical synchronization pulse through OR gates 31A to 31D to the input of each four-digit counter 35.

FIG. 3 shows a series of waveforms appearing at the various points of the display unit 13. When the switch $S_D$ is operated the binary states of the four-digit counters 35A to 35D are such that an output 60 (FIG. 3A) is generated from AND gate 34B and applied through OR gate 41 and lead 42 to the trigger input of flip-flop 50 to generate a pulse 61 (FIG. 3B) at the true output thereof. The pulse 61 serves as a horizontal beam position bias potential which, when combined with horizontal sawtooth waves, will produce a series of sawtooth waves 62 (FIG. 3D). The pulse from AND gate 34B is also applied to the video signal transmission gate 40B to pass the video signal on channel B to the control electrode of the cathode ray tube. The "1" logic state of the complementary state of the complementary output of flip-flop 52 is combined with the vertical deflection voltage in the network 54 to generate vertical deflection waveforms as shown in FIG. 3E. The original image corresponding to the signal on channel B is thus reproduced on the upper right corner of the screen of the cathode ray tube 51. The next pulse 63 from AND gate 34C will turn off flip-flop 50 which in turn turns off flip-flop 52 so that no bias potentials are generated to reproduce the original image that corresponds to signals on channel C until the subsequent pulse 64 from AND gate 34D. The pulse 64 will turn on flip-flop 50 to generate an output pulse 65 to serve as a horizontal beam positioning bias for reproduction of the original image corresponding to the video signal on channel D. A pulse 66 from AND gate 34A will turn off flip-flop 50 and turns on flip-flop 52 to generate a vertical beam positioning bias 67 to reproduce the original image corresponding to signals on channel A.

The images A, B, C and D as depicted in FIG. 2 appear in step with the occurrence of outputs from AND gates 34A to 34D in sequence determined by the stored count of each counter 35 in the allocated areas of the screen determined by the operating sequence of switches $S_A$ to $S_D$ as soon as all of the selector switches have been operated.

Since the image corresponding to each video channel persist for as long as one-fourth the complete cycle of image reproduction to permit other images to be reproduced, it is preferable to employ a cathode ray tube with a screen coated with a phosphor material of long persistency.

It will be understood therefore that the images A to D can be alloted to any areas of the screen by the operating sequence of the selector switches so that a desired combination of images can be selected from among $n$ combinations where $n$ is the number of channels to be reproduced. The invention is particularly useful for arranging various images conveying correlated pictorial information to permit the viewer to analyze the correlation between such images, or for synthesizing an image from a plurality of fragmentary pieces of visual information.

With the circuit arrangement so far described, a combination of four video images is reproduced within equally divided areas of a cathode-ray-tube screen. The amplitude of the horizontal and vertical deflection voltages is half the normal amplitude of the deflection voltages. It is also possible to reproduce an image within an enclosed area or island by suitably choosing the amplitude of the deflection voltages.

What is claimed is:
1. Apparatus for displaying a plurality of channels of video information including vertical synchronization pulses on divided areas of the screen of a cathode ray tube with deflection means energized by horizontal and vertical sawtooth deflection potentials of such values that each video channel is reproduced on a selected one of the divided areas, comprising:
    a channel selection circuit having a plurality of manually operated switches equal in number to said channels;
    means for sequentially generating output pulses in each step with a vertical synchronization pulse contained in said video information in the same order of sequence as the operating sequence of said switches;
    gate means responsive to said output pulses for passing said video information to said cathode ray tube; and
    means responsive to said output pulses for generating a series of horizontal and vertical beam positioning DC potentials for biasing said horizontal and vertical sawtooth deflection potentials, respectively, such that the video information passed through said gate means is reproduced on corresponding one of the divided areas of the screen.

2. Apparatus as claimed in claim 1, wherein said output pulse generating means comprises a plurality of counters corresponding to said switches, each of the counters providing an output for every count of $n$ input pulses applied thereto, where $n$ equals to the number of said switches, means for disabling each of said counters while the corresponding switch is not operated, and means for supplying an input pulse to said counters in response to the operation of said switches.

3. Apparatus as claimed in claim 2, further including means for applying said output from each said counter to said gate means as a gating pulse therefor when all of said switches have been operated, and means for applying said vertical synchronization pulses to said counters after all of said switches have been operated.

4. Apparatus as claimed in claim 3, wherein each of said switches of the channel selection circuit is of a momentary type, and wherein the channel selection circuit further includes a bistable device connected to each of said switches for assuming one of binary states in response to the operation of the switch connected thereto, a momentary type manually operated reset switch for resetting the storage elements to assume the other binary state, the output of each bistable device being connected to corresponding one of the counters to reset the same when the bistable device is in the other binary state and further connected to a first AND gate to activate the same when the bistable device is in said one binary state, and wherein the output applying means includes a second AND gate associated with each of the counters for passing the output from the associated counter to said gate means in response to the occurrence of an output from the first AND gate.

5. Apparatus as claimed in claim 4, wherein said means for generating horizontal and vertical beam positioning DC potentials comprises a plurality of bistable devices each having trigger and reset input terminals, the reset input terminals of the bistable devices being connected together to respond to the operation of said reset switch, the trigger input terminal of one of the bistable devices being connected to respond to the output from the second AND gate, and means for combining the outputs from the bistable devices with said horizontal and vertical sawtooth deflection potentials.

* * * * *